US011326690B2

(12) United States Patent
Van Camp (10) Patent No.: US 11,326,690 B2
(45) Date of Patent: May 10, 2022

(54) BRAKE TRANSMISSION SHIFT INTERLOCK SYSTEMS AND CONTROL LOGIC FOR MOTOR VEHICLE POWERTRAINS

(71) Applicant: GM Global Technology Operations LLC, Detroit, MI (US)

(72) Inventor: Michael A. Van Camp, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 16/371,733

(22) Filed: Apr. 1, 2019

(65) Prior Publication Data

US 2020/0309261 A1    Oct. 1, 2020

(51) Int. Cl.
*F16H 61/22* (2006.01)
*F16H 59/10* (2006.01)

(52) U.S. Cl.
CPC .......... *F16H 61/22* (2013.01); *F16H 59/105* (2013.01); *F16H 2061/223* (2013.01)

(58) Field of Classification Search
CPC .. F16H 61/22; F16H 59/105; F16H 2061/223; B60W 2540/06; B60R 25/066; B60R 25/02144
See application file for complete search history.

(56) References Cited

U.S. PATENT DOCUMENTS

| 4,474,085 | A |   | 10/1984 | DeVogelaere et al. |
| 5,003,799 | A | * | 4/1991  | Imai ..................... F16H 59/10 |
|           |   |   |         | 70/247 |
| 5,009,295 | A |   | 4/1991  | Kinkade et al. |
| 5,167,308 | A |   | 12/1992 | Osborn |
| 5,203,440 | A | * | 4/1993  | Peterson, Jr. .......... B60K 17/28 |
|           |   |   |         | 180/273 |
| 5,445,575 | A | * | 8/1995  | Sundeen ........... B60R 25/02144 |
|           |   |   |         | 477/99 |

(Continued)

FOREIGN PATENT DOCUMENTS

| CN | 101994818 A | 3/2011 |
| CN | 202418534 U | 9/2012 |
| CN | 104428565 A | 3/2015 |

*Primary Examiner* — Victor L MacArthur
*Assistant Examiner* — Gregory T Prather
(74) *Attorney, Agent, or Firm* — Quinn IP Law (57) ABSTRACT

Presented are Brake Transmission Shift Interlock (BTSI) systems for vehicle powertrains, methods for making/operating such BTSI systems, and vehicles equipped with a BTSI system. A BTSI system for a motor vehicle includes a shifter solenoid with a solenoid body that mounts to the vehicle body, and a solenoid armature that is movably attached to the solenoid body to transition back-and-forth between locked and unlocked positions. The shifter solenoid is selectively operable via a brake control module to move the solenoid armature between the locked and unlocked positions to thereby block and unblock movement of a gear shifter from the park position, respectively. A position switch mounts to the vehicle body adjacent the shifter solenoid and detects the vehicle transmission being in a park mode. The position switch selectively mechanically engages with the shifter solenoid such that the solenoid armature, upon moving to the locked position, pushes closed the position switch.

20 Claims, 3 Drawing Sheets

(56) References Cited

U.S. PATENT DOCUMENTS

| | | | |
|---|---|---|---|
| 5,562,568 A * | 10/1996 | Smale | B60R 25/02144 |
| | | | 192/220 |
| 5,647,465 A | 7/1997 | Burkhard et al. | |
| 5,846,160 A | 12/1998 | Tuday | |
| 6,151,977 A | 11/2000 | Menig et al. | |
| 6,592,492 B1 | 7/2003 | Kalia | |
| 8,210,989 B2 | 7/2012 | Vermeersch et al. | |
| 8,602,194 B2 | 12/2013 | Vermeersch | |
| 2002/0002849 A1* | 1/2002 | Syamoto | B60R 25/063 |
| | | | 70/248 |
| 2004/0043865 A1* | 3/2004 | Avers | F16H 61/22 |
| | | | 477/96 |
| 2006/0223668 A1 | 10/2006 | Wang | |
| 2008/0093194 A1* | 4/2008 | Vermeersch | F16H 61/22 |
| | | | 192/220.2 |
| 2015/0159750 A1* | 6/2015 | Rake | F16H 59/105 |
| | | | 74/473.28 |
| 2016/0327156 A1* | 11/2016 | Kumar | F16H 59/0208 |

* cited by examiner

BRAKE TRANSMISSION SHIFT INTERLOCK SYSTEMS AND CONTROL LOGIC FOR MOTOR VEHICLE POWERTRAINS

INTRODUCTION

The present disclosure relates generally to motor vehicles powertrains. More specifically, aspects of this disclosure relate to shifter interlock systems for controlling the shifting of automatic vehicle transmissions between different operating modes.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources, such as an electric traction motor, to propel the vehicle and, thus, minimize or eliminate reliance on a fossil-fuel based engine for tractive power.

A vehicle transmission may use differential gearing to achieve variable torque and multiple speed ratios between the transmission's input and output shafts. One form of differential gearing is the epicyclic "planetary gear" arrangement. Planetary gearing offers the advantage of compactness and different torque and speed ratios among members of the planetary gearing subsets. Hydraulically actuated torque establishing devices, such as clutches and brakes (the term "clutch" often used to refer to both clutches and brakes), are selectively engageable to activate the aforementioned gear elements for establishing desired forward and reverse speed ratios between the transmission's input and output shafts. Shifting from one speed ratio to another is generally performed in response to engine throttle and vehicle speed, and normally involves releasing one or more "off-going" clutches associated with the current or attained speed ratio, and applying one or more "on-coming" clutches associated with the desired or commanded speed ratio.

Most automatic power transmissions have multiple operating modes; automobiles conforming to U.S. Government standards, for example, have at least a park (P) mode, a reverse (R) mode, a neutral (N) mode, and multiple drive modes, including a full-range drive (D) mode and a low (L) gear mode. A gear selector mechanism, such as a gear shift lever or a gear shift knob—colloquially a "shifter" or "PRNDL" (an acronym for 'Park-Reverse-Neutral-Drive-Low'; pronounced "prindle")—is controlled by a vehicle operator for selectively moving between these various transmission operating modes. Modern automobiles are equipped with a Brake Transmission Shift Interlock (BTSI) feature that prohibits movement of the shift lever from a park position unless the ignition switch is in an on state and the brake pedal is depressed by the vehicle operator. As a result, a vehicle equipped with an automatic transmission is prevented from powering the drive wheels in either a reverse or forward direction without first freeing the steering wheel for normal driving by release of the "Park Lock" feature and immobilizing the vehicle by the driver placing his or her foot on the brake pedal.

SUMMARY

Disclosed herein are Brake Transmission Shift Interlock (BTSI) systems and attendant control logic for motor vehicle powertrains, methods for making and methods for operating such BTSI systems, and motor vehicles equipped with a BTSI sensor that utilizes a resistor ladder circuit for detecting a current BTSI state (locked or unlocked). By way of example, there are presented BTSI system architectures that integrate a BTSI position switch sensor with a BTSI shifter solenoid, both of which are electrically connected to a "tap up/tap down" resistor ladder circuit. The resistor ladder circuit includes three resistors electrically connected to one another in parallel, with control switches on at least two of the three ladder resistors. All three ladder resistors are connected in electrical series with a fourth resistor, which functions as a current limiting device. The BTSI position switch is electrically connected in series with the resistor ladder circuit via the fourth resistor. In addition, the BTSI shifter solenoid directly mechanically engages the BTSI position switch such that moving the solenoid to a LOCKED position will physically close the position switch. When moved to an UNLOCKED position, the BTSI shifter solenoid mechanically disengages the BTSI position switch such that the switch concurrently opens.

Attendant benefits for at least some of the disclosed concepts include a BTSI system architecture that uses a multifunctional resistor ladder circuit in conjunction with a combination BTSI solenoid and position switch to detect shifter state, thereby eliminating the need for an electromechanical switch and other dedicated hardware for system state monitoring. In so doing, the related materials, manufacturing, warranty, and design costs associated with such dedicated hardware is minimized or otherwise eliminated. Removing an electromechanical BTSI-state switch and its supporting electrical circuit also helps to eliminate any resultant noise associated with operating the switch. Other attendant benefits may include the ability to resolve a severity ten (10) Failure Modes and Effects Analysis (FMEA) system failure, such as a vehicle park lock mechanism of the BTSI system that has failed in an UNLOCKED position.

Aspects of the present disclosure are directed to BTSI systems and attendant control logic for preventing an automatic vehicle transmission from being shifted out of the park position without the brake pedal first being depressed. In an example, a representative BTSI system is presented that includes a shifter solenoid fabricated with a protective solenoid body that rigidly mounts to the vehicle body, e.g., adjacent a gear shifter that moves between a park position and various gear positions to shift the vehicle's power transmission between different transmission operating modes. A solenoid armature is movably attached to the solenoid body to transition back-and-forth between locked and unlocked positions. A resident or remote electronic controller, such as a dedicated system control module, controls the shifter solenoid to selectively move the solenoid armature to the locked (or unlocked) position to thereby block (or unblock) movement of the gear shifter from the park position. An electrical position switch, which mounts to the shifter body adjacent the shifter solenoid, is operable to detect the transmission being in a park mode. In particular, this position switch selectively mechanically engages the shifter solenoid such that the solenoid armature, upon moving to the locked position, pushes closed the position switch. Conversely, movement of the solenoid armature to the unlocked position allows the position switch to open, e.g., under the force of a return spring.

Other aspects of the present disclosure are directed to motor vehicles with a BTSI system that utilizes a resistor ladder circuit and a combination position switch and shifter solenoid for detecting the current state of the BTSI system. As used herein, the term "motor vehicle" may include any relevant vehicle platform, such as passenger vehicles (internal combustion engine (ICE), hybrid, full electric, fuel cell, partially or fully autonomous, etc.), commercial vehicles, industrial vehicles, tracked vehicles, off-road and all-terrain vehicles (ATV), snowmobiles, motorcycles, boats, airplanes, etc. In an example, a motor vehicle is presented that is equipped with a prime mover (e.g., engine and/or motor) mounted to the vehicle body and operable to drive one or more of the vehicle's road wheels to thereby propel the motor vehicle. A multi-speed automatic transmission, which is mounted to the vehicle body and operatively connected to the prime mover, is operable to selectively modify the torque being transferred from the prime mover to the road wheel(s). Mounted within the passenger compartment is a gear shifter mechanism that is movable between a park position, a neutral position, and multiple gear positions (e.g., reverse, drive, and low gear positions) to shift the transmission between different transmission operating modes. In at least some embodiments, the gear shifter mechanism may comprise a P-R-N-D shift knob that operates in conjunction with a terrain-selecting low gear rotary dial. As a further option, the transmission may be an electrohydraulic auto-manual transmission controlled by an electronic input device, such as upshift/downshift triggers integrated into the gear shifter and/or upshift/downshift paddles integrated into the driver's steering wheel. A resident or remote electronic control module is communicatively connected with the gear shifter, a vehicle brake system, and a vehicle starter system.

Continuing with the above example, the motor vehicle also includes a BTSI system with a shifter solenoid and a position switch. The shifter solenoid is fabricated with a solenoid body that is mounted to the vehicle body, and a solenoid armature that is movably attached to the solenoid body to transition back-and-forth between locked and unlocked positions. The shifter solenoid is selectively operable, e.g., via the electronic control module, to move the solenoid armature between the locked and unlocked positions to thereby block and unblock movement of the gear shifter from the park position, respectively. The position switch, which is mounted to the vehicle body adjacent the shifter solenoid, detects whether or not the transmission is in a park mode. The position switch may be electrically connected in series to a resistor ladder circuit. The position switch is selectively mechanically engageable with the shifter solenoid such that the solenoid armature, upon moving to the locked position, e.g., under the bias force of a spring, pushes closed the position switch. Movement of the solenoid armature, e.g., via a selectively energizable solenoid coil, to the unlocked position allows the position switch to open.

Additional aspects of this disclosure are directed to control algorithms and computer-readable media storing processor-executable instructions for making and for using BTSI systems. In an example, a method is presented for governing operation of a BTSI system. The foregoing representative method includes, in any order and in any combination with any of the above and below options and features: transmitting, via a resident or remote electronic control module, an activation command signal to a shifter solenoid, the shifter solenoid including a solenoid body mounted to the vehicle body, and a solenoid armature attached to the solenoid body to move between locked and unlocked positions, the activation command signal causing the solenoid armature to move from the locked position to the unlocked position to thereby unblock movement of the gear shifter from the park position; and discontinue transmitting the activation command signal via the electronic control module to the shifter solenoid to cause the solenoid armature to move from the unlocked position to the locked position to thereby block movement of the gear shifter from the park position. With this architecture, moving the solenoid armature to the unlocked position mechanically disengages the shifter solenoid from a BTSI position switch mounted adjacent the shifter solenoid such that the position switch opens and the electronic control module detects the transmission is not in a park mode. Moving the solenoid armature to the locked position will mechanically engage the shifter solenoid with the position switch such that the solenoid armature pushes closed the position switch and the electronic control module detects the transmission is in a park mode.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," "generally," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Figure 1:
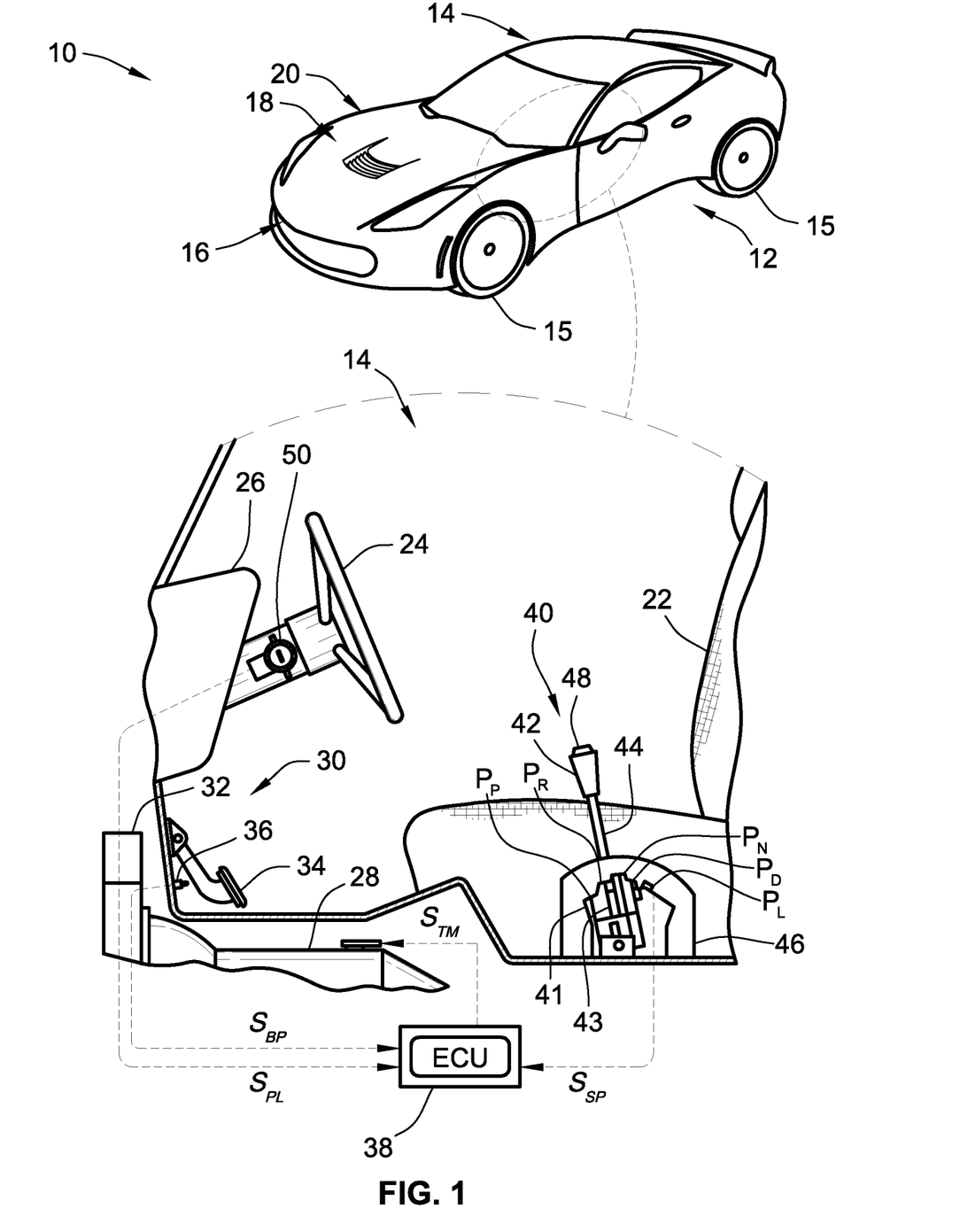
FIG. 1 is a perspective-view illustration of a representative motor vehicle with an inset view of the vehicle passenger compartment showing a driver seat with a representative gear shifter in accordance with aspects of the present disclosure.

Referring now to the drawings, wherein like reference numbers refer to like features throughout the several views, there is shown in FIG. 1 a representative automobile, which is designated generally at 10 and portrayed for purposes of discussion as a two-seat, coupe-style passenger vehicle. Mounted to the body 12 of the vehicle 10, e.g., forward of a vehicle passenger compartment 14 and aft of a front bumper assembly 16, is an engine hood assembly 18 that extends across and covers the upper extent of an engine compartment 20. The illustrated automobile 10—also referred to herein as "motor vehicle" or "vehicle" for short—is merely an exemplary application with which aspects and features of this disclosure may be practiced. In the same vein, implementation of the present concepts for the particular shift knob arrangement presented in the drawings should also be appreciated as an exemplary application of novel features disclosed herein. As such, it will be understood that aspects and features of this disclosure may be integrated into other gear shifter architectures, and implemented for any logically relevant type of motor vehicle. Moreover, only select components of the shifter interlock systems and motor vehicles are shown and will be described in additional detail below. Nevertheless, the vehicles and system architectures discussed herein may include numerous additional and alternative features, and other available peripheral components, for example, for carrying out the various methods and functions of this disclosure.

Presented in the inset view of FIG. 1 is a perspective view inside the vehicle passenger compartment 14, showing a driver seat assembly 22 facing a steering wheel 24 of a vehicle steering system and a dashboard instrument panel 26 that displays instrumentation, vehicle dynamics data, and controls for the vehicle's operation. A vehicle powertrain—represented in FIG. 1 by a transmission 28 and a prime mover 32—is designed to launch and propel the vehicle 10, to operate the vehicle 10 in reverse and all forward gear ranges between low and high road speeds, and to power any combination of the onboard vehicle electronics. Transmission 28 may be embodied as an electrohydraulic automanual transmission assembly with a train of intermeshing gear elements (not visible) that is selectively engaged through operation of discrete controller-automated clutching elements. The prime mover 32 transfers power, preferably by way of torque via an output shaft or similarly suitable output member, to an input side of the transmission 28. Prime mover 32 may be embodied as a restartable, reciprocating-piston type internal combustion engine (ICE) assembly that is drivingly connected to a final drive system (e.g., road wheels 15) by the multi-speed power transmission 28. The ICE assembly may operate alone or in conjunction with or may be supplanted by one or more electric motor generator units (MGU). Although not explicitly portrayed in FIG. 1, it should be appreciated that the vehicle's final drive system may take on any available configuration, including front wheel drive (FWD) layouts, rear wheel drive (RWD) layouts, four-wheel drive (4WD) layouts, all-wheel drive (AWD) layouts, etc.

Slowing and stopping of vehicle 10 is controlled, at least on part, by a vehicle brake system 30, which is activated and deactivated by a vehicle operator (not shown) respectively depressing and releasing a brake pedal 34 with his/her foot. The brake pedal 34 is moveable between a released position and any of multiple applied positions, at which the brake pedal 34 presses against a linear or rotational transducer 36 operable to determine the position of the brake pedal 34 and a corresponding brake force to be applied to the road wheels 15. The transducer 36 may take on any of various suitable electronic and electromechanical sensing device configurations that are activated by engagement of the pedal 34. A brake pedal position signal $S_{BP}$ is sent via the transducer 36 to an electronic control unit (ECU) 38 as part of park lock and shifter interlock control of a gear shifter assembly 40. In FIG. 1, the dashed arrows interconnecting the various electronic and electromechanical components are emblematic of electronic signals or other communication exchanges by which data and/or control commands are transmitted, wired or wirelessly, from one component to the other.

With continuing reference to FIG. 1, the gear shifter assembly 40 includes a manually controlled gear shift knob 42 that is moveable in fore and aft directions between a park (P) position $P_P$, a reverse (R) position $P_R$, a neutral (N) position $P_N$, a drive (D) position $P_D$, and low gear (L) position $P_L$. The gear shift knob 42 is buttressed on an upper end of a shaft 44 that extends into a shifter housing 46. Actuation of a shifter button 48 projecting from the upper extent of the gear shift knob 42 allows the shaft 44 to move between the foregoing shifter positions with respect to the shifter housing 46. A Brake Transmission Shift Interlock (BTSI) system 60, illustrated schematically in FIG. 2 and discussed in extensive detail below, prevents the gear shift knob 42 from being moved out of the park (P) position $P_P$ unless and until the brake pedal 34 is depressed. Optionally, the shift knob 42 may also be blocked from movement out of the park (P) position $P_P$ until the prime mover 32 is started, e.g., via movement of a vehicle ignition switch 50 from an OFF position to an ON position, as confirmed by an electrical park lock signal $S_{PL}$. After the prime mover 32 is cranked and the brake pedal 34 is pushed to an applied position, the shifter button 48 may be depressed and the gear shift knob 42 moved into the reverse (R), neutral (N), drive (D), and low gear (L) positions $P_R$, $P_N$, $P_D$, $P_L$. An electrical shifter position signal $S_{SP}$ corresponding to the selected position of the shift knob 42 is sent to the ECU 38; a powertrain control module (PCM) (FIG. 2) embedded within the vehicle ECU 38, in turn, sends an electrical command signal $S_{TM}$ for shifting the transmission 28 into the appropriate transmission operating mode.

Figure 2:
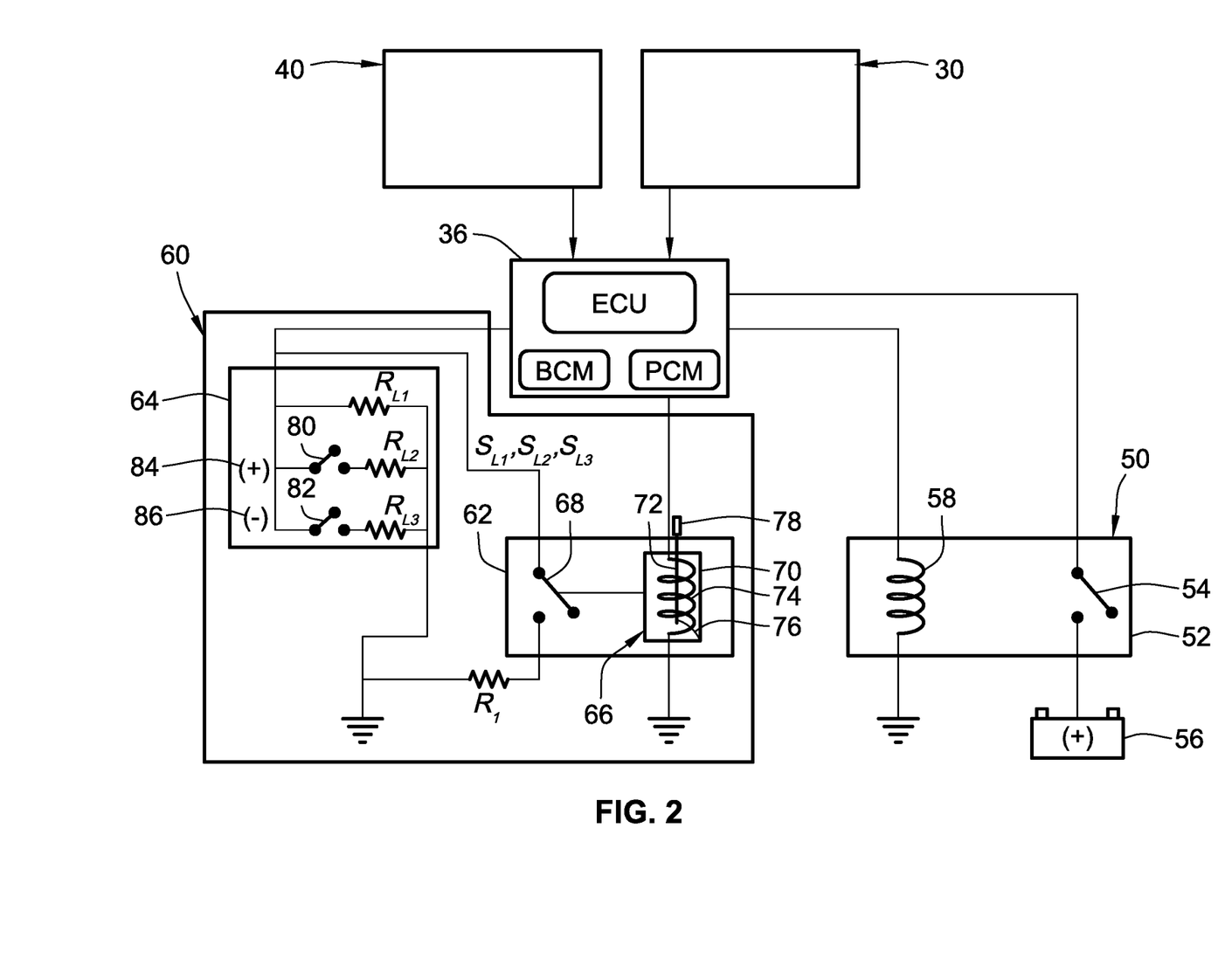
FIG. 2 is a schematic diagram of select electronic components of the representative gear shifter of FIG. 1 with a representative Brake Transmission Shift Interlock (BTSI) system in accordance with aspects of the present disclosure.

FIG. 2 diagrammatically illustrates select components of the representative gear shifter assembly 40 of FIG. 1 with a representative BTSI system 60 that prohibits movement of the gear shift knob 42 from the park (P) position $P_P$ unless the vehicle ignition switch 50 is in an on state and the brake pedal 34 is depressed by the vehicle operator. When the vehicle 10 is stopped and the prime mover 32 is keyed off, a vehicle key (not shown) may be inserted into a key lock cylinder 52 of the ignition switch 50. Once fully inserted, the vehicle key is then rotated, e.g., counterclockwise in FIG. 1, to an ON position. In so doing, an electrical ignition-starter switch 54 is closed to electrically connect a 12V starting-lighting-ignition (SLI) battery 56 to a starter solenoid and a starter motor (not shown) causing the vehicle's starter system to start the prime mover 32. With a park lock feature, the vehicle key is prevented from being removed from the ignition switch 50 until the vehicle 10 is stopped and the vehicle key rotated, e.g., clockwise in FIG. 1, to an OFF position. When the vehicle 10 is stopped and the gear shift knob 42 moved to the park (P) position $P_P$, an electrical signal is sent by a brake control module (BCM) embedded in the ECU 38 to the vehicle ignition switch 50 to energize a key release solenoid 58 such that the vehicle key can be removed from the key lock cylinder 52. It should be appreciated that the disclosed features are similarly applicable to vehicle platforms equipped with an ignition button or other keyless ignition system operable for turning the prime mover 32 on and off. What's more, the BTSI system 60 of FIG. 2 does not require a park lock function to carry out many disclosed aspects and features.

BTSI system 60 of FIG. 2 is generally composed of two primary components: an electromechanical BTSI sensor assembly 62 and a "tap up/tap down" resistor ladder circuit 64. The BTSI sensor assembly 62 includes a BTSI shifter solenoid 66 that selectively mechanically engages a BTSI position switch 68. As shown, the BTSI position switch 68 is mounted immediately adjacent the BTSI shifter solenoid 66, e.g., within the shifter housing 46 inside the vehicle passenger compartment 14. This position switch 68 detects whether or not the BTSI system 60 is in a locked or unlocked state and, at the same time, whether or not the transmission 28 is in a park or gear mode. By way of non-limiting example, the BTSI position switch 68 may be a normally open (N/O) electrical switch device that is selectively closed through direct physical contact with the BTSI shifter solenoid 66. Closing of the BTSI position switch 68 will transmit to the ECU 38 an electrical signal indicating the BTSI system 60 is locked and the transmission 28 is in park. Conversely, release of the BTSI position switch 68 through operation of the BTSI shifter solenoid 66, as explained below, will transmit to the ECU 38 an electrical signal indicating the BTSI system 60 is unlocked and the transmission 28 is in gear or neutral. Unlike many conventional BTSI systems, position switch 68 physically engages neither the shifter gate pawl 43 nor the gear shift knob 42/shaft 44. It is envisioned that the BTSI position switch 68 takes on any suitable electrical switch design, including a micro switch, a reed-type switch, a Hall-effect switch, etc.

With continuing reference to FIG. 2, the BTSI shifter solenoid 66 is provided with a solenoid body 70 that mounts to the vehicle body 12, e.g., within the shifter housing 46 interposed between a park detent on a shifter gate 41 and a shift gate pawl 43 (FIG. 1). A metallic solenoid armature 72 is slidably attached to the solenoid body 70 to translate back-and-forth in a reciprocating manner along a rectilinear path between locked and unlocked positions. The BTSI shifter solenoid 66 is an electromagnetic device that is selectively operable via an electrical actuation signal from the BCM of vehicle ECU 38. This actuation signal energizes an electrically conductive helical coil 74 that encircles at least a portion of the solenoid armature 72. In so doing, a magnetic field is created that causes the solenoid armature 72 to translate between the locked and unlocked positions. It is envisioned that the BTSI shifter solenoid 66 take on any suitable solenoid design, including normally open and normally closed configurations. Notably, there is no direct electrical connection between the BTSI shifter solenoid 66 and the BTSI position switch 68 in the architecture of FIG. 2.

For a normally closed (N/C) solenoid configuration, a biasing member, such as leaf spring 76 of FIG. 2, pushes the solenoid armature 72 outward from the solenoid body 70 to a fully extended and "locked" position. At this locked position, the solenoid armature 72 physically presses against and closes the BTSI position switch 68 and concomitantly blocks the gear shift knob 42 from being moved out of the park (P) position $P_P$. In accord with the illustrated example, an inhibitor 78 is attached to a distal end of the solenoid armature 72 on the exterior of the solenoid body 70. When the solenoid armature 72 is biased to the locked position, this inhibitor 78 abuts and thereby prevents movement of the shift gate pawl 43 out of engagement with the park detent on the shifter gate 41. For at least some applications, the solenoid armature 72 may contemporaneously activate a park brake system and/or lock a transmission output shaft to thereby lock the automobile 10 in park. After keying on the prime mover 32 and depressing the brake pedal 34, the BTSI shifter solenoid 66 is energized via ECU 38 to retract the solenoid armature 72 from its normal (unpowered) position; this will physically disengage the armature 72 from the BTSI position switch 68 and concomitantly unblock the gear shift knob 42. As noted above, BTSI position switch 68 automatically opens upon physical disengagement with the solenoid armature 72.

BTSI system 60 of FIG. 2 is also equipped with a resistor ladder circuit 64 that is electrically connected to the BTSI sensor assembly 62. By way of example, and not limitation, an in-line (first) resistor $R_1$ is electrically connected to an interposed between the resistor ladder circuit 64 and the BTSI sensor assembly 62. For at least some implementations, in-line resistor $R_1$ functions as a current limiting device. As shown, the resistor ladder circuit 64, the BTSI position switch 68, and the in-line resistor $R_1$ are electrically connect in series with one another and with the ECU 38. Similar to the BTSI position switch 68, there is no direct electrical connection between the resistor ladder circuit 64 and the BTSI shifter solenoid 66 in the architecture of FIG. 2.

As the name implies, the resistor ladder circuit 64 of FIG. 2 is typified by an electrical circuit with multiple resistors that are electrically connected in parallel with one another in a ladder-like arrangement. While it is envisioned that the resistor ladder circuit 64 may comprise assorted combinations of resistors and switches and other circuit devices, the resistor ladder circuit 64 is shown in FIG. 2 with three "ladder" resistors, namely first, second and third ladder resistors $R_{L1}$, $R_{L2}$, and $R_{L3}$, respectively, and two "ladder" switches, namely first and second ladder switches 80 and 82, respectively. Each of these ladder resistors $R_{L1}$, $R_{L2}$, $R_{L3}$ is electrically connected in series with both the BTSI position switch 68 and the in-line resistor $R_1$. In addition, the first ladder switch 80 is electrically connected in series with the second ladder resistor $R_{L2}$, while the second ladder switch 82 is electrically connected in series with the third ladder resistor $R_{L3}$. Operation of the two ladder switches 80, 82 may be controlled, in whole or in part, by an electronic input device, such as upshift and downshift triggers/paddles 84 and 86, respectively, that may be integrated into the shift knob 42 and/or driver's steering wheel 24. Upshift trigger/paddle 84 receives a gear upshift request from a driver of the vehicle 10; receipt of the gear upshift request causes the first ladder switch 80 to close. In the same vein, downshift trigger/paddle 86 receives a gear downshift request from the vehicle driver; receipt of the gear downshift request causes the second ladder switch 82 to close.

To determine the current operating state of the BTSI system 60 and the current operating mode of the transmission 28, the ECU 38 monitors one or more electrical characteristics of the BTSI sensor assembly 62 and resistor ladder circuit 64. For instance, a valid (first) locked signal $S_{L1}$ of a first current/voltage governed by resistors $R_{L1}$ and $R_1$ is transmitted by the BTSI system 60 to the ECU 38 responsive to the BTSI position switch 68 being closed and both the ladder switches 80, 82 being open. A valid (second) locked signal $S_{L2}$ of a second current/voltage governed by resistors $R_{L1}$, $R_{L2}$ and $R_1$ is transmitted by the BTSI system 60 to the ECU 38 responsive to the BTSI position switch 68 and first ladder switch 80 being closed and the second ladder switch 82 being open. Lastly, a valid (third) locked signal $S_{L3}$ of a third current/voltage governed by resistors $R_{L1}$, $R_{L3}$ and $R_1$ is transmitted by the BTSI system 60 to the ECU 38 responsive to the position switch 68 and second ladder switch 82 being closed and the first ladder switch 80 being open. Generally speaking, the first and second ladder switches 80, 82 may not be closed at the same time.

Figure 3:
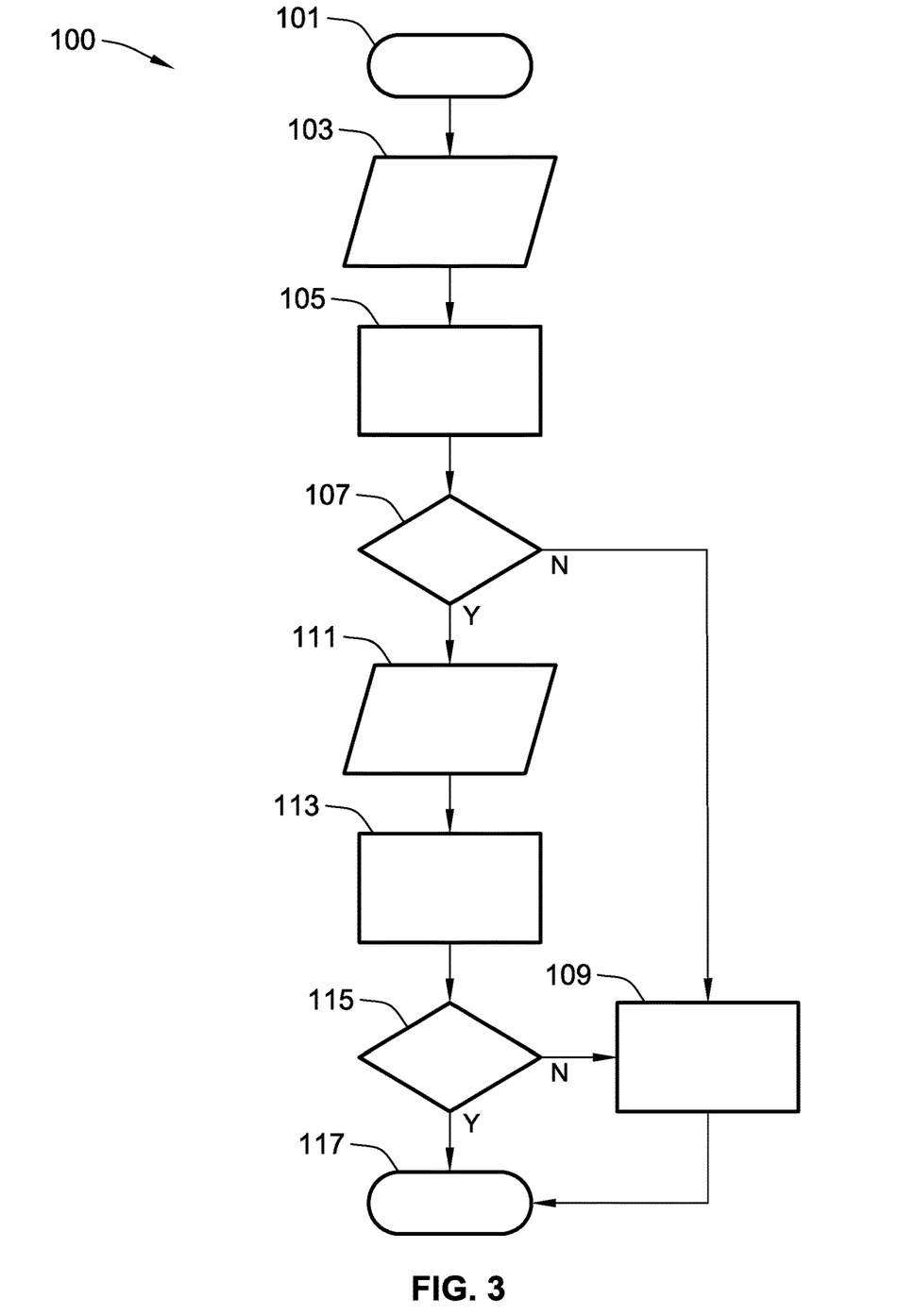
FIG. 3 is a flowchart illustrating a representative BTSI control algorithm for detecting a current BTSI state, which may correspond to memory-stored instructions executed by onboard and/or remote control-logic circuitry, programmable electronic control unit, or other computer-based device or network of devices in accord with aspects of the disclosed concepts.

With reference now to the flowchart of FIG. 3, an improved method or control strategy for governing operation of a shifter interlock system, such as BTSI system 60 of FIG. 2, for a motor vehicle, such as automobile 10 of FIG. 1, is generally described at 100 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by a resident or remote controller, processing unit, control logic circuit, or other module, device and/or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 of FIG. 3 with processor-executable instructions for a programmable controller or control module or similarly suitable processor to call up an initialization procedure for a BTSI state determination protocol. This routine may be executed in real-time, continuously, systematically, sporadically, and/or at regular intervals during active vehicle operation. To carry out this protocol, a vehicle control system or any combination of one or more subsystems may be operable to receive, process, and synthesize pertinent information and inputs, and execute control logic and algorithms to regulate various powertrain, starter system, and brake system components to achieve desired control targets. At input/output block 103, the method 100 includes receiving one or more electrical signals indicating the vehicle's prime mover (e.g., prime mover 32 of FIG. 1) is keyed on, and one or more electrical signals indicating a brake pedal is being depressed by the vehicle's operator.

Responsive to the electrical signal(s) received at input/output block 103, process block 105 provides processor-executable instructions for an electronic control module, such as BCM and/or PCM of ECU 38, to transmit one or more activation command signals to a shifter solenoid, such as BTSI shifter solenoid 66. An activation command signal causes a solenoid armature of the shifter solenoid to move from a locked position to an unlocked position, e.g., as described above with respect to FIG. 2, to thereby unblock movement of a gear shifter, such as gear shift knob 42 of FIG. 1. At decision block 107, the method 100 determines if the BTSI system is in an unlocked state. As indicated above in the discussion of FIG. 2, for example, moving the solenoid armature 72 of the BTSI shifter solenoid 66 to the unlocked position mechanically disengages the shifter solenoid 66 from the BTSI position switch 68. This, in turn, allows the BTSI position switch 68 to open. The ECU 38 detects the opening of the BTSI position switch 68, e.g., via the resultant change in circuit voltage/current caused by the electrical disconnecting of at least resistors $R_1$ and $R_{L1}$ of FIG. 2. If the ECU 38 does not detect the BTSI system 60 being in an unlocked state (Block 107=NO), the method 100 proceeds to process block 109 and outputs a failure mode signal indicating a detected fault in the BTSI system.

If no fault is detected (Block 107=YES), the method 100 continues to input/output block 111 and receives one or more electrical signals indicating the vehicle's brake pedal (e.g., brake pedal 34 of FIG. 1) is being depressed and the gear shifter has been moved back to the park position. Responsive to the electrical signal(s) received at input/output block 111, process block 113 provides processor-executable instructions for an electronic control module, such as BCM and/or PCM of ECU 38, to discontinue transmitting the activation command signal to the shifter solenoid. This will cause the solenoid armature to return to its locked position to thereby block movement of the gear shifter from the park position. At decision block 115, the method 100 determines if the BTSI system is now in a locked state. As indicated above in the discussion of FIG. 2, for example, moving the solenoid armature to the locked position mechanically engages the shifter solenoid with the position switch. In this manner, the solenoid armature pushes closed the position switch and locks the transmission in a park mode. If the ECU 38 does not detect the BTSI system 60 being in the locked state (Block 115=NO), the method 100 proceeds to process block 109 and outputs a failure mode signal indicating a detected fault in the BTSI system. Otherwise, the method 100 continues to terminal block 117 and temporarily terminates or returns to terminal block 101 and persists in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A brake transmission shift interlock (BTSI) system for a motor vehicle having a vehicle body, a transmission mounted to the vehicle body, a gear shifter movable between park and gear positions to shift the transmission between different operating modes, and an electronic control module communicatively connected with the gear shifter, the BTSI system comprising:
    a shifter solenoid including a solenoid body configured to mount to the vehicle body, and a solenoid armature movably attached to the solenoid body to transition between locked and unlocked positions, the shifter solenoid being selectively operable via the electronic control module to move the solenoid armature between the locked and unlocked positions to thereby block and unblock movement of the gear shifter from the park position, respectively;
    a position switch configured to mount to the vehicle body adjacent the shifter solenoid and detect the transmission being in a park mode, the position switch being selectively mechanically engageable with the shifter solenoid such that the solenoid armature, upon moving to the locked position, pushes closed the position switch; and
    a resistor ladder circuit electrically connected to the position switch.

2. The BTSI system of claim 1, wherein the position switch is a normally open electrical switch device.

3. The BTSI system of claim 1, further comprising a first resistor electrically connected to and interposed between the resistor ladder circuit and the position switch.

4. The BTSI system of claim 3, wherein the resistor ladder circuit, the first resistor, and the position switch are configured to electrically connect in series with the electronic control module.

5. The BTSI system of claim 3, wherein the resistor ladder circuit includes a plurality of ladder resistors electrically connected in parallel with one another, and wherein each of the ladder resistors is electrically connected in series with the position switch and the first resistor.

6. The BTSI system of claim 5, wherein the plurality of ladder resistors includes first, second, and third ladder resistors, the resistor ladder circuit further including a first ladder switch electrically connected in series with the second ladder resistor, and a second ladder switch electrically connected in series with the third ladder resistor.

7. The BTSI system of claim 6, wherein:
    a first locked signal is transmitted by the BTSI system to the electronic control module responsive to the position switch being closed and the first and second ladder switches being open;
    a second locked signal is transmitted by the BTSI system to the electronic control module responsive to the position switch and the first ladder switch being closed and the second ladder switch being open; and
    a third locked signal is transmitted by the BTSI system to the electronic control module responsive to the position switch and the second ladder switch being closed and the first ladder switch being open.

8. The BTSI system of claim 6, wherein the motor vehicle further includes an electronic input device configured to receive gear upshift and gear downshift requests from a driver, wherein receipt of the gear upshift request by the electronic input device causes the first ladder switch to close, and wherein receipt of the gear downshift request by the electronic input device causes the second ladder switch to close.

9. The BTSI system of claim 1, wherein the position switch includes a micro switch, a reed-type switch, and/or a Hall-effect switch.

10. The BTSI system of claim 1, wherein the position switch is characterized by a lack of a selective mechanical engagement with the gear shifter.

11. The BTSI system of claim 1, wherein the shifter solenoid further includes:
    an electrically conductive coil encircling at least a portion of the solenoid armature and configured, when energized, to move the solenoid armature to the unlocked position; and a biasing member biasing the solenoid armature to the locked position to thereby mechanically close the position switch and block the gear shifter from moving from the park position to any one of the gear positions.

12. The BTSI system of claim 11, wherein the shifter solenoid further includes an inhibitor attached to the solenoid armature and configured, when the solenoid armature is in the locked position, to abut and thereby prevent movement of a shift lever pawl out of engagement with a park detent in a shifter gate.

13. A motor vehicle comprising:
a vehicle body;
a plurality of road wheels attached to the vehicle body;
a prime mover attached to the vehicle body and configured to drive at least one of the road wheels to thereby propel the motor vehicle;
a multi-speed power transmission attached to the vehicle body and operable to selectively modify torque transfer from the prime mover to the at least one of the road wheels;
a gear shifter movable between a park position and multiple gear positions to shift the transmission between different transmission operating modes;
an electronic control module communicatively connected with the gear shifter; and
a brake transmission shift interlock (BTSI) system, including:
a shifter solenoid with a solenoid body mounted to the vehicle body, and a solenoid armature movably attached to the solenoid body to transition between locked and unlocked positions, the shifter solenoid being selectively operable via the electronic control module to move the solenoid armature between the locked and unlocked positions to thereby block and unblock movement of the gear shifter from the park position, respectively;
a position switch mounted to the vehicle body adjacent the shifter solenoid and configured to detect the transmission being in a park mode, the position switch being selectively mechanically engageable with the shifter solenoid such that the solenoid armature, upon moving to the locked position, pushes closed the position switch; and
a resistor ladder circuit electrically connected to the position switch.

14. A method of controlling operation of a brake transmission shift interlock (BT SI) system for a motor vehicle, the motor vehicle having a vehicle body, a transmission mounted to the vehicle body, a gear shifter mounted to the vehicle body and movable between park and gear positions to shift the transmission between different operating modes, and an electronic control module communicatively connected with the gear shifter, the method comprising:
transmitting, via the electronic control module, an activation command signal to a shifter solenoid, the shifter solenoid including a solenoid body mounted to the vehicle body, and a solenoid armature attached to the solenoid body to move between locked and unlocked positions, the activation command signal causing the solenoid armature to move from the locked position to the unlocked position to thereby unblock movement of the gear shifter from the park position,
wherein moving the solenoid armature to the unlocked position mechanically disengages the shifter solenoid from a position switch mounted to the vehicle body adjacent the shifter solenoid such that the position switch opens and the electronic control module detects the transmission is not in a park mode; and
discontinue transmitting the activation command signal via the electronic control module to the shifter solenoid to cause the solenoid armature to move from the unlocked position to the locked position to thereby block movement of the gear shifter from the park position,
wherein moving the solenoid armature to the locked position mechanically engages the shifter solenoid with the position switch such that the solenoid armature pushes closed the position switch and the electronic control module detects the transmission is in a park mode.

15. The method of claim 14, wherein the BTSI system further comprises a resistor ladder circuit electrically connected to the position switch.

16. The method of claim 15, wherein the BTSI system further comprises a first resistor electrically connected to and interposed between the resistor ladder circuit and the position switch.

17. The method of claim 16, wherein the resistor ladder circuit, the first resistor, and the position switch are configured to electrically connect in series with the electronic control module.

18. The method of claim 16, wherein the resistor ladder circuit includes a plurality of ladder resistors electrically connected in parallel with one another, and wherein each of the ladder resistors is electrically connected in series with the position switch and the first resistor.

19. The method of claim 18, wherein the plurality of ladder resistors includes first, second, and third ladder resistors, the resistor ladder circuit further including a first ladder switch electrically connected in series with the second ladder resistor, and a second ladder switch electrically connected in series with the third ladder resistor.

20. The method of claim 19, further comprising:
receiving, via an electronic input device from a driver of the motor vehicle, a gear upshift request causing the first ladder switch to close; and
receiving, via the electronic input device from the driver of the motor vehicle, a gear downshift request causing the second ladder switch to close.

* * * * *